United States Patent

Tsuyama et al.

Patent Number: 5,469,359
Date of Patent: * Nov. 21, 1995

[54] TRACTION CONTROL DEVICE FOR VEHICLES

[75] Inventors: Toshiaki Tsuyama, Higashi-Hiroshima; Toru Onaka, Hiroshima; Kazutoshi Nobumoto, Hiroshima; Makoto Kawamura, Hiroshima, all of Japan

[73] Assignee: Mazda Motor Corporation, Hiroshima, Japan

[*] Notice: The portion of the term of this patent subsequent to Nov. 15, 2011, has been disclaimed.

[21] Appl. No.: 301,417

[22] Filed: Sep. 8, 1994

Related U.S. Application Data

[63] Continuation of Ser. No. 711,876, Jun. 7, 1991, Pat. No. 5,365,443.

[30] Foreign Application Priority Data

Jun. 7, 1990 [JP] Japan ................................ 2-149628

[51] Int. Cl.⁶ ........................... B60T 8/32; B60K 31/00
[52] U.S. Cl. ........................... 364/426.03; 364/426.02; 180/197
[58] Field of Search ................... 364/426.03, 426.02, 364/424.05; 180/197; 303/95, 97, 103, 113.2

[56] References Cited

U.S. PATENT DOCUMENTS

| | | | |
|---|---|---|---|
| 4,682,667 | 7/1987 | Hosaka | 180/197 |
| 4,825,367 | 4/1989 | Nagaoka et al. | 364/424.05 |
| 4,866,623 | 9/1989 | Ise et al. | 364/426.03 |
| 4,981,190 | 1/1991 | Nakayama et al. | 180/197 |
| 4,985,838 | 1/1991 | Hashiguchi et al. | 364/426.02 |
| 5,070,461 | 12/1991 | Nobumoto et al. | 364/426.03 |
| 5,083,631 | 1/1992 | Nakayama et al. | 364/426.03 |
| 5,092,435 | 3/1992 | Sone et al. | 364/426.03 |

FOREIGN PATENT DOCUMENTS

| | | |
|---|---|---|
| 180095 | 5/1986 | European Pat. Off. . |
| 325291 | 7/1989 | European Pat. Off. . |
| 386792 | 9/1990 | European Pat. Off. . |
| 3904572 | 8/1989 | Germany . |
| 62-137258 | 6/1987 | Japan . |

*Primary Examiner*—Kevin J. Teska
*Assistant Examiner*—Tan Q. Nguyen
*Attorney, Agent, or Firm*—Keck, Mahin & Cate

[57] ABSTRACT

A traction control device operates to determine the speed of each of the left and right drive wheels of a vehicle, determine the speed of each of the left and right passive wheels of the vehicle, calculate the actual slip rate of the drive wheels of the vehicle directly based on the measurements of the speeds for the drive and passive wheels, establish a target slip rate and control the driving condition of the vehicle by making the actual slip rate equal the target slip rate. The actual slip rate is matched to the target slip rate by controlling engine output and braking power. The step of controlling the driving condition of the vehicle by controlling the engine output and the braking power is carried out according to the time differential of the difference between the actual slip rate and the target slip rate at least until the actual slip rate matches the target slip rate for the first time. After the actual slip rate has matched the target slip rate at least once, the step of controlling is carried out according to the proportion of the difference between the actual and the target slip rates.

11 Claims, 4 Drawing Sheets

TRACTION CONTROL DEVICE FOR VEHICLES

This is a continuation of U.S. application Ser. No. 07/711,876, filed Jun. 7, 1991, now U.S. Pat. No. 5,365,443.

BACKGROUND OF THE INVENTION

1. Field of the Invention

The present invention relates to a traction control device for a vehicle and, in particular, to a traction control which is responsive to the running condition of the vehicle. The invention also relates to a traction control method for accomplishing high responsiveness to the running condition of the vehicle.

2. Description of the Prior Art

The slip rate of a vehicle's wheels increases during periods of acceleration when the drive wheels are driven with excessive power. A traction control acts to prevent a decrease in accelerating ability by determining the slip rate of the drive wheels and controlling the engine output or the braking power so that the slip rate does not exceed a prescribed value.

Japanese Unexamined Patent Publication (hereinafter Kokai) No. Sho 62-137258, laid open to the public in 1987, discloses an example of such a traction control device.

The prior art traction control disclosed in the above Japanese Kokai No. Sho 62-137258 has the problem that control with good responsiveness is not necessarily achieved.

SUMMARY OF THE INVENTION

It is therefore an object of the present invention to propose a control device which makes it possible to achieve a desired slip rate swiftly and with high responsiveness.

It is another object of the present invention to provide a traction control method which makes it possible to achieve a desired slip rate swiftly and with high responsiveness.

The above object is achieved according to the present invention by providing a traction control device comprising means for detecting the speed of each of the left and right drive wheels of the vehicle; means for determining the speeds of each of the left and right passive wheels of the vehicle; means for calculating the actual slip rate of the drive wheels of the vehicle directly based on the measurements of the speeds for the drive and passive wheels; means for establishing a target slip rate; and means for controlling the driving condition of the vehicle by making the actual slip rate equal the target slip rate. The actual slip rate is matched to the target slip rate by controlling the engine output and the braking power. The step of controlling the vehicle by controlling the engine output and the braking power is carried out according to the time differential of the difference between the actual slip rate and the target slip rate at least until the actual slip rate matches the target slip rate for the first time. After the actual slip rate has matched the target slip rate at least once, the proportional element of the difference between the actual and the target slip rates is included for controlling the engine output and/or the braking power.

There does not necessarily have to be only one target slip rate. A plurality of target slip rates may be established, such as an engine control slip rate for carrying out the engine output control and a braking power target slip rate for carrying out the brake system control. In the above case, the braking power target slip rate may be set at a larger value than the engine target slip rate in order to cut down body vibration and to keep the frequency of use as low as possible.

A particular feature of the present invention is that the control steps are carried out in order to match the actual slip rate to the target slip rate, and, in order to achieve this end, the brake force of the wheels is controlled while the control method is being changed in response to the driving condition of the vehicle.

Control means are provided so that the braking force of each of the drive wheels is controlled identically at least in the time period from when the control steps are initiated until the difference between the actual slip rate and the target slip rate for any one of the drive wheels has reached a maximum. After any one of the drive wheels has passed the above period, the braking force for the each of the wheels is controlled independently based on the above difference between the actual and target slip rates.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

In the present invention, the slip rate of each of the drive wheels is calculated from the results of the speed detections of each of the wheels. Thereafter, the target slip rates are established, and, in order to match the actual slip rates with the target slip rates, the engine output and braking power are controlled by the control means. The control is changed according to the driving condition of the vehicle. In the period between when the traction control is first engaged and when the target slip rate is attained for the first time, control is carried out at least with respect to the time differential of the difference between the target slip rate and the actual slip rate. After that, the control is carried out at least with respect to the proportional difference between the target slip rate and the actual slip rate.

A particular feature of the present invention is that when, for any of the drive wheels, the difference between the slip rates is being increased, and when a hydraulic pressure in the brake system is necessary to be increased for reducing the difference between the slip rates, the brake force of both of the drive wheels is controlled identically.

After the above period wherein a maximum difference has been reached in both of the drive wheels, and when the difference between the slip rates starts to be reduced, the control of the brake force based on the above difference is carried out independently for each of the drive wheels.

The present invention will now be explained with reference to the preferred embodiment and the drawings.

Figure 1:
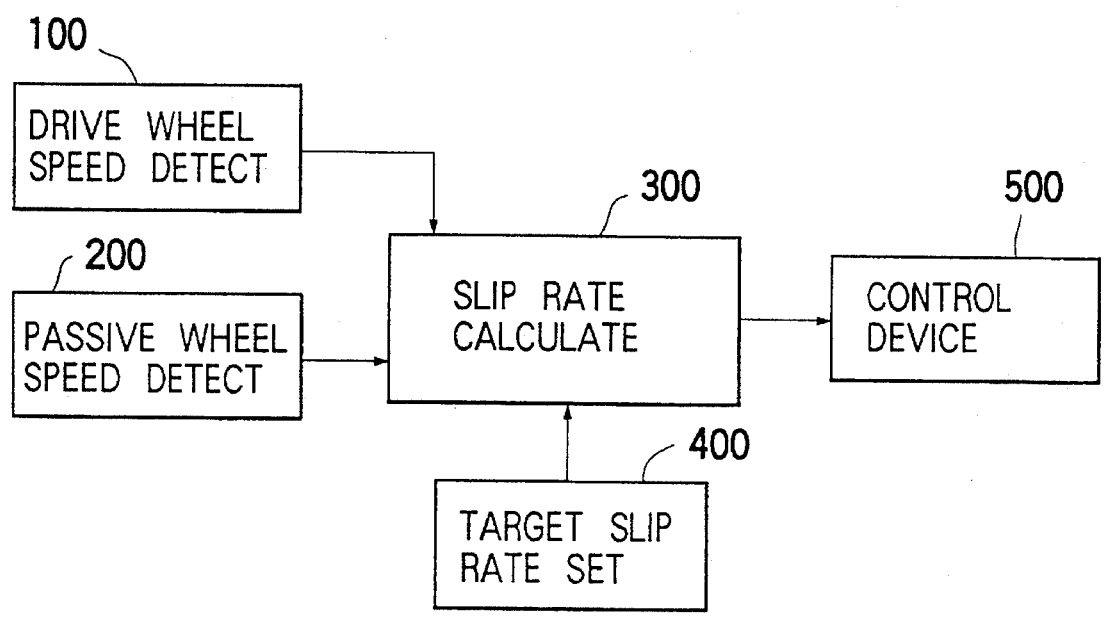
FIG. 1 is a block diagram showing the basic construction of the device according to the present invention.

As is seen in FIG. 1, the speeds of each of the left and right drive wheels are determined by the drive wheel speed detecting device 100. The speeds of each of the left and right passive wheels are detected by the passive wheel speed detecting device 200. The actual slip rates are calculated using the values detected above for the speeds of the drive wheels and the passive wheels by the slip rate calculating device 300. The target slip rate is established by the target slip rate establishing device 400. The engine output and braking power control device 500 is provided to match the above actual slip rates with the target slip rates while changing the control method in response to the driving condition of the vehicle.

In the above control device 500, the engine output or braking power is controlled, at least during the period from the beginning of the control operation until the target slip rate is reached for the first time, according to the time differential of the difference between the target and actual slip rates (i.e., the change in the difference with respect to time). The control device 500 is put together so that after the slip rate reaches the target slip rate at least once, the control is carried out according to the proportional difference between the target and actual slip rates.

Summary of the Construction of the Vehicle

Figure 2:
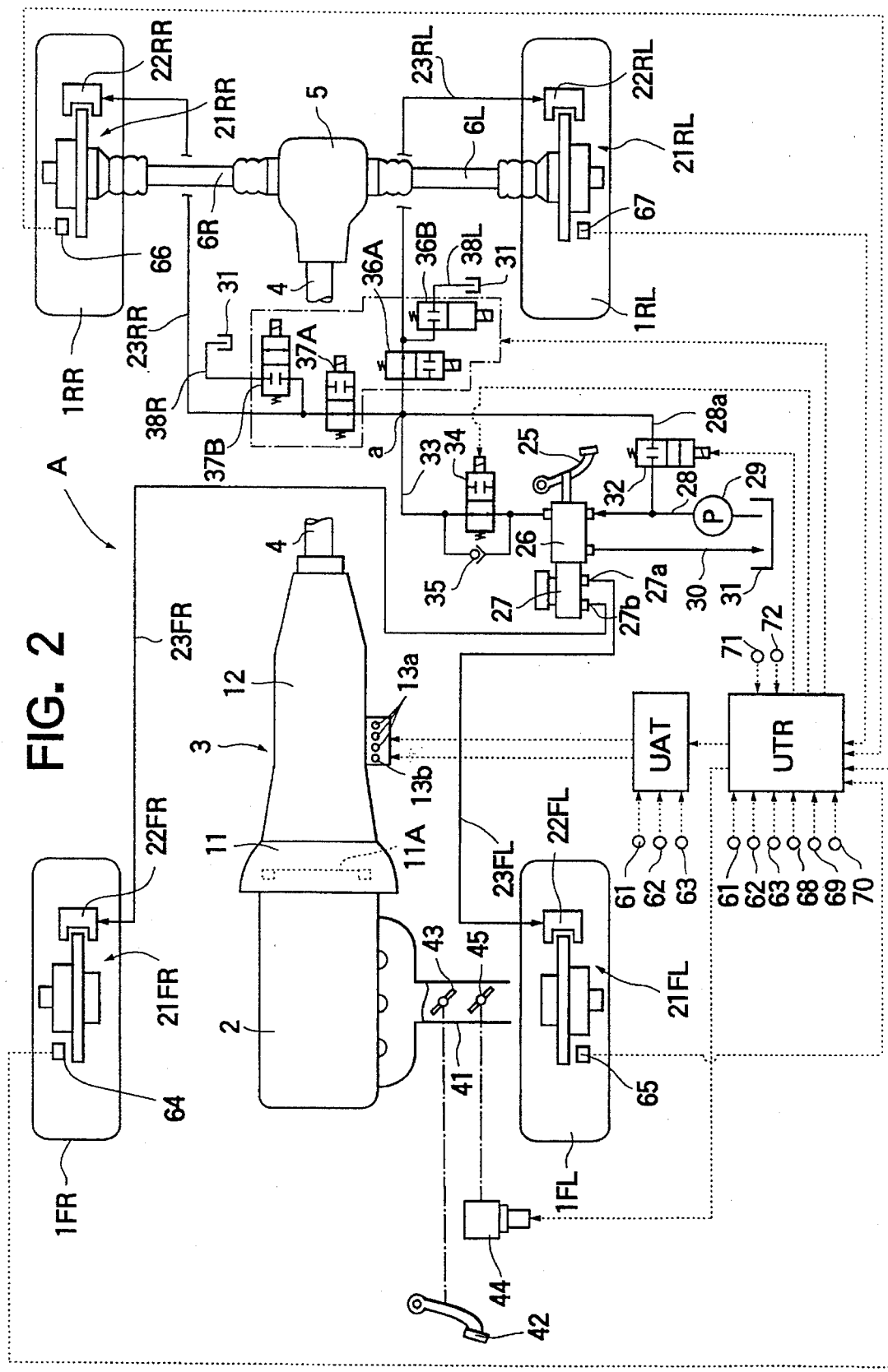
FIG. 2 is a complete system diagram of the preferred embodiment of the present invention.

FIG. 2 is a system diagram of a vehicle engine and a hydraulic circuit for controlling the wheel brakes to which the present invention is applied.

Vehicle A is provided with the above mentioned wheels, that is passive wheels 1 FL and 1 FR, and drive wheels 1 RL and 1 RR.

Engine 2 is loaded in the front portion of the body of vehicle A. The output side of engine 2, more specifically the output side of automatic transmission 3 is connected to propeller shaft 4. Engine output is transmitted to the left and right drive wheels 1 RL and 1 RR by means of the drive wheel axles 6 L and 6 R and by means of the differential gear device 5 which is connected to propeller shaft 4.

Construction of the Automatic Transmission

The automatic transmission 3 is comprised of a torque converter 11 and a multispeed gear box 12. In addition, in order to switch the hydraulic circuit to the desired speed, a plurality of solenoids 13*a* are provided in the multispeed gearbox 12. Torque converter 11 is provided with a lock-up clutch 11A. Solenoid 13*b* is provided for controlling the operation of the lock-up clutch.

An automatic transmission control unit UAT is provided for controlling the above solenoids 13*a* and 13*b*. A speed control map and a map for controlling the lock-up are stored in the automatic transmission control unit UAT. The control unit UAT generates control signals sent to the solenoids 13*a* and 13*b* with reference to these maps and thus controls the speed and the lock-up.

In order to achieve the above object, the following signals are sent to the control unit UAT: a signal from the main throttle valve opening sensor 61 which detects the opening of the main throttle valve 43; a signal from the sub-throttle opening sensor 62 which detects the opening of the sub-throttle valve 45; and a signal from the speed sensor 63 which detects the speed. In place of the speed sensor, one may use a sensor which detects the rotational speed of the propeller shaft 4.

Construction of the Brake Hydraulics Adjustment Mechanism

An hydraulic brake system is provided for braking each of the wheels 1. Brakes 21 FR, 21 FL, 21 RR and 21 RL are provided, respectively for each of the wheels 1 FR, 1 FL, 1 RL, and 1 RL. Respective brake cylinders 22 FR, 22 FL, 22 RR, and 22 RL are provided for each brake 21. The brake cylinders 22 are provided with respective conduits 23 FR, 23 FL, 23 RR, and 23 RL for supplying brake fluid.

The brake system is provided with a brake pedal 25 by means of which the driver of the vehicle registers a treading force, a force multiplying device 26 which multiplies the pedal treading force by using an hydraulic booster, and a tandem-type master cylinder 27 for being connected to the device 26. The master cylinder is connected to the various brakes as follows: first exhaust port 27*a* is connected to the left front wheel brake 21 by means of brake line 23 FL; second exhaust port 27*b* is connected to right front wheel brake 21 FR by means of brake line 23 FR.

The power multiplying device 26 is connected to pump 29 by means of line 28 so that the pump 29 can supply hydraulic fluid thereto.

Excess hydraulic fluid is made to return to a reserve take 31 over a return line 30 connected to the pump. Branch line 28*a* branches off of line 28. An electromagnetic closing valve 32 is arranged in line 28*a*. A line 33 extends from power multiplying device 26. Electromagnetic valve 34 is provided in line 33 and a unidirectional valve 35 is provided in a parallel arrangement to valve 34.

At down-stream position a, branch line 28*a* and line 33 flow together. At point a, the lines 28*a*, 33 are connected to the brake lines 23 RL, 23 RR for the rear wheel brakes. Electromagnetic valves 36A and 37A are disposed in lines 23 RL and 23 RR, respectively. Down stream of valves 36A, 37A, respectively, electromagnetic valves 36B and 37B are provided in relief lines 38L and 38R.

Construction of the Engine Torque Adjustment Device

An air intake passage 41 flows into the engine 2. In the air intake passage 41 are disposed a main throttle valve 43 operatively connected to the accelerator pedal 42; and a subthrottle valve 45 operatively connected to an actuator 44 for adjusting the opening of the throttle. In this case, because the main throttle 43 and the subthrottle 45 are disposed in series the opening of the entire throttle is determined by whichever throttle is open least.

Construction of the Control Unit for the Traction Control

The control unit UTR for the traction control is provided to control the operation of the valves 32, 34, 36A, 37A, 36B, and 37B, and the actuator 44 of the subthrottle valve 45. In other words, with the object of traction control, the control unit UTR controls the engine output, and, by controlling the brake hydraulics, the braking force of the wheels.

The signals of the wheel speed sensors 64, 65, 66, and 67, which determine the speeds of each of the wheels, are inputted into the control unit UTR. In addition, various other signals are inputted, such as that of the main throttle opening sensor 61, that of the subthrottle opening sensor 62, that of the vehicle speed sensor 63, that of the acceleration stroke sensor 68, that of the yaw rate sensor 69, that of the shift sensor 70, that of the steering angle sensor 71 of the steering wheel, and that of the manual operation traction control selection switch 72.

The control unit UTR is provided with an input interface for receiving and entering signals from each of the above sensors; a microcomputer having a CPU, a ROM, and a RAM; an output interface; and a drive circuit for driving valves 32, 34, 36A, 37A, 36B, 37B and actuator 44.

Programs necessary for traction control and various maps are stored in the ROM. Various memories necessary for carrying out traction control are provided in the RAM.

Contents of the Traction Control

The traction control maintains a desired slip rate in order to efficiently transfer the drive power of the drive wheels to the road surface.

The traction control of the preferred embodiment comprises a slip rate engine control to obtain the desired slip rate by controlling the output of the engine 2, and a slip rate brake control for attaining the desired slip rate by controlling the brake force of wheels 1 RR and 1 RL.

The above slip rate engine control takes place by means of the subthrottle valve 45. When the slip rate engine control is not carried out, the subthrottle valve 45 is completely open.

As a result, when the engine control is not carried out, the throttle opening is the opening of the main throttle valve 43.

In the traction control of the preferred embodiment, a target slip rate is established for the slip rate engine control, and if the first threshold value of the slip rate of the drive wheels is exceeded, the slip rate engine control is initiated. When the control is initiated, the actuator 44 is actuated and gives feedback control to the subthrottle 45. Thereafter, when a second threshold value greater than the first threshold value is exceeded, the subthrottle is momentarily closed until a lower limit is reached in the slip rate engine control. Then, feed back control of the slip rate of the drive wheels is carried out by means of the operation of the actuator 44 and the corresponding opening of the subthrottle valve 45 to achieve the target slip rate.

In the slip rate brake control, a target slip rate is established which is greater than the above target slip rate for the slip rate engine control. Brake control is also initiated when the above first threshold value is exceeded.

When the brake control is initiated, in order to match the slip rate to the target slip rate, the hydraulic pressure supplied to each of the brake cylinders 22 is feedback controlled.

The above target slip rates used in the slip rate brake control and the slip rate engine control are determined, for example, depending on the friction coefficient μ of the road surface, the vehicle speed, the acceleration stroke, the steering angle of the steering wheel, and the sporty or hard suspension mode.

Slip Rate Brake Control

In the slip rate brake control of the preferred embodiment, the elements of the control change according to the driving condition of the vehicle.

The traction control is initiated and, in order to counteract the increase in the difference between the slip rate and the target slip rate STB, the control unit UTR causes the brake hydraulic pressure to increase from zero, thereby increasing the brake force and causing the slip rate to decrease. In the above case, in order to swiftly match the target slip rate STB, feed back control is effected by means of differential control (Phase 0 control). In Phase 0 control, the hydraulic pressure of the brakes is comparatively rapidly increased. If the hydraulic pressure of the brakes were independently controlled in accordance with the respective slip rates of the left and right drive wheels 1 RL and 1 RR, unbalanced braking power would result and there would be the fear of driving instability. Therefore, in the present embodiment, in Phase 0 control, the hydraulic supply in the vehicle is controlled so that the difference in the braking power between left and right drive wheels 1 RL and 1 RR is not excessively large (Unified Control).

In Phase 0 control, after the slip rate turns around and begins to decrease, after a prescribed period of time, the control unit switches to a differential control method decreasing, or maintaining the brake fluid pressure (Phase 1 Control). In Phase 1 control, because there isn't the above fear of driving instability occurring, the left and right drive wheels 1 RL and 1 RR are controlled independently (Independent Control).

With respect to the slip rate brake control, once the slip rate becomes less than the target slip rate STB, the control unit UTR switches to a feed back control method which is a combination of proportional and differential control (Phase 2 Control). In Phase 2 control, each of the drive wheels 1 RL and 1 RR is also controlled independently.

Figure 3:
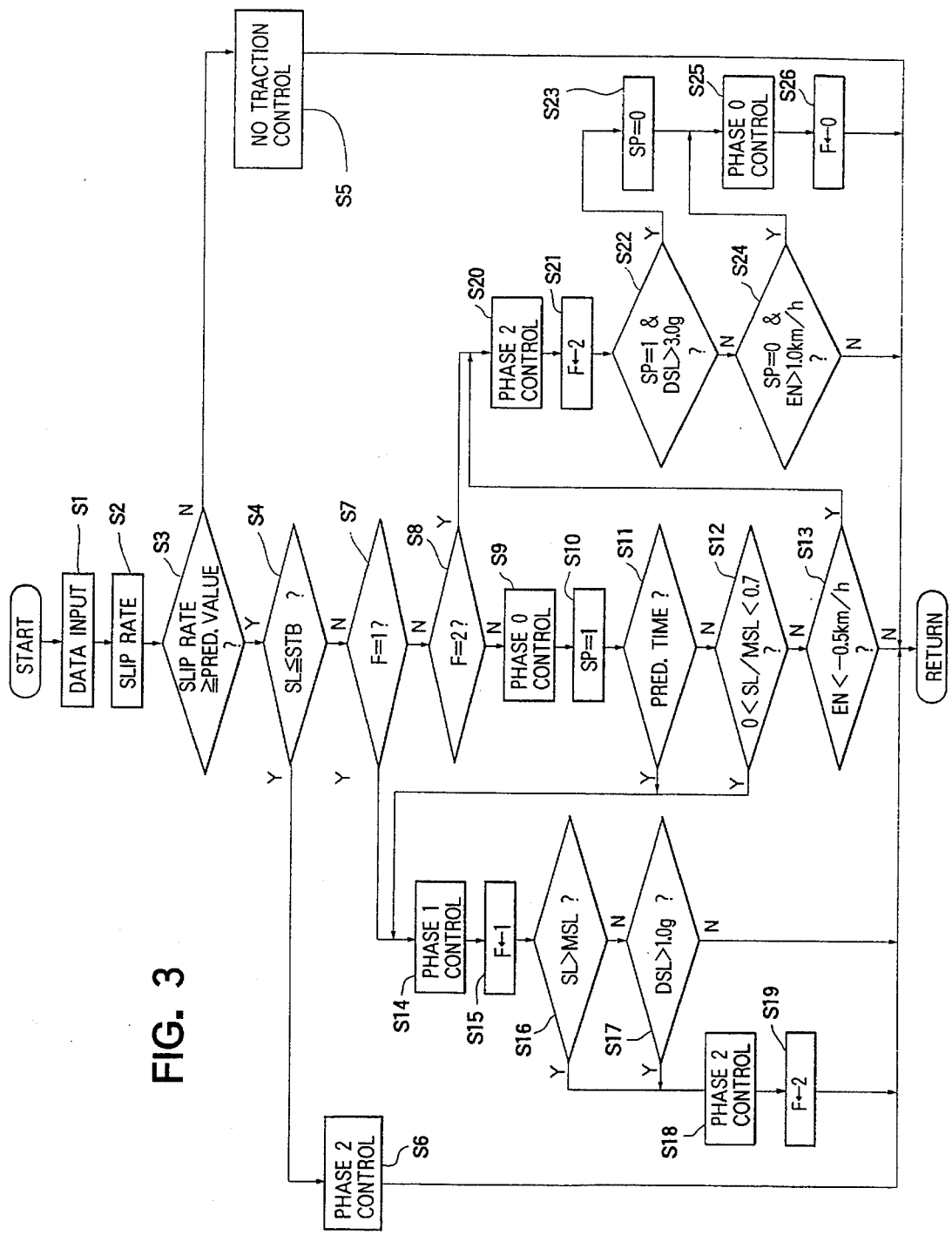
FIG. 3 is a traction control flow chart of the embodiment of FIG. 2 and an outline of the method according to the present invention.

Referring to FIG. 3, a flow diagram of the slip rate brake control is explained.

The control unit UTR inputs the data read from the sensor signals (S1). Then, the control unit UTR calculates the slip rate for the left and right drive wheels based on this data (S2). Because the various speeds of the wheels are measured according to the present embodiment, the slip rates of the left and right drive wheels 1 RR and 1 RL, i.e., SR and SL, can be called up based on the value of the difference between the speed of the drive wheels 1 RR and 1 RL and the average speed of the passive wheels 1 FR and 1 FL.

Although the control for the right and left drive wheels 1 RR and 1 RL takes place independently in Phase 1 and Phase 2 control, because the elements of the control are the same for each of the wheels, the operation will be explained only with respect to the slip rate of the left drive wheel 1 RL. The control and Unitary Control of the other drive wheel are omitted. However, in Unitary Control, the wheels are equivalent when either of the wheels satisfy the conditions of Unitary Control.

Next, the control unit UTR determines whether the slip rate is greater than the prescribed value or not (S3).

If the answer is Yes, it is determined whether the slip rate of drive wheel 1 RL is smaller than the slip rate brake control target slip rate STB or not (S4).

If the answer to step (S3) is No, that is that the slip rate is less than the prescribed value, traction control does not take place (S5). In step (S4), if the slip rate is less than the target slip rate of the slip rate brake control, the control unit executes Phase 2 control (S6).

If, in step (S4), the slip rate exceeds the target slip rate, after traction control has been initiated, the control unit determines whether Phase 1 control has occurred or not with respect to drive wheel 1 RL based on whether the value of flag F is 1 or not (S7).

In step (S7), if the answer is No, the control unit determines, after the traction control has been initiated, whether or not with respect to drive wheel 1 RL Phase 2 control has occurred (S8).

Also if the answer to step (S7) is No, it may be indicated after the traction control is initiated that neither Phase 1, nor Phase 2 control is taking place. That is, the slip rate is presently exceeding the target slip rate STB and that for the first time after traction control is initiated the slip rate is shown to be increasing.

In the latter case, the control unit UTR executes Phase 0 control (S9). That is, with respect to left and right drive wheels 1 RL and 1 RR, differential, Unitary Control of the brake fluid pressure is effected. Because for the first time after the initiation of traction control the slip rate SL is increasing and phase 0 control is being effected, the control unit UTR sets a flag SP to be 1 (S10).

Next, the control unit UTR decides whether a prescribed time period has passed (S11). If the prescribed time period has not passed, it is determined whether the ratio SL/MSL of the present slip rate SL of the left drive wheel 1 RL to the peak time slip rate MSL is less than the prescribed value 0.7 or not (S12). If the control unit UTR answers step (S12) No, that is, that the ratio SL/MSL is greater than or equal to the prescribed value 0.7, it is determined whether the difference EN between (a) the average slip rate of the left and right drive wheels and (b) the engine control slip rate STA (which is set at less than the brake control target slip rate STB) is less than the prescribed value 0.5 km/h or not (S13). In the above step (S11), if the result of whether the prescribed time period has passed or not is affirmative, or if the answer to step (S11) is No and in step (S12) the above ratio SL/MSL is less than the prescribed value 0.7, the control unit UTR will effect Phase 1 control (S14).

In order to indicate that Phase 1 control is being effected, the control unit sets flag F at 1 (S15).

Next, the control unit UTR determines whether the present slip rate SL exceeds or doesn't exceed the peak slip rate MSL experienced since the initiation of traction control. If MSL is not being exceeded, it is then determined whether the derivative DSL (in units of acceleration) of the slip rate SL (in units of speed), that is, the rate of change of the slip rate, is greater than the predetermined value 1.0 g (g is the acceleration due to gravity) in step (S17). If it is not greater than 1.0 g, then Phase 1 control continues as is. If in step (S16) the answer is Yes, that is that the present slip rate has exceeded the peak value MSL of the slip rate since after the initiation of traction control, or if in step (S17) the derivative DSL is greater than the prescribed value 1.0 g, then the control unit changes from feed back control toward the target slip rate STB in Phase 1 control to Phase 2 control (S18). In this case, in order to indicate that Phase 2 control is being effected, the control unit sets flag F at 2 (S19).

If the difference EN between the average slip rate of the left and right drive wheels 1 RL and 1 RR and the engine control target slip rate is smaller than the prescribed value of 0.5 km/h, then the control unit UTR changes from Phase 0 control to Phase 2 control (S20). In order to indicate this change, the control unit sets the flag F at 2 (S21).

Next, the control unit determines whether or not after the beginning of traction control the change in the slip rate is increased beyond the target value STB for the first time, and the differential of the difference between the speed of wheel 1 RL and the brake control target slip rate STB does not exceed the prescribed value of 3.0 g (S22). If the answer is Yes, the control unit sets the flag SP to be 0 (S23) and carries out the phase 0 control (S25). If the answer in step (S22) is No, the control unit UTR further determines whether or not the slip rate has exceeded the target value STB for the first time after initiation of traction control and whether the difference EN is exceeding the prescribed value 1.0 km/h (S24). If the answer to step (S24) is negative, then the control unit UTR effects Phase 0 control and sets flag F to 0 (S25, S26).

Slip Rate Brake Control Example

Figure 4:
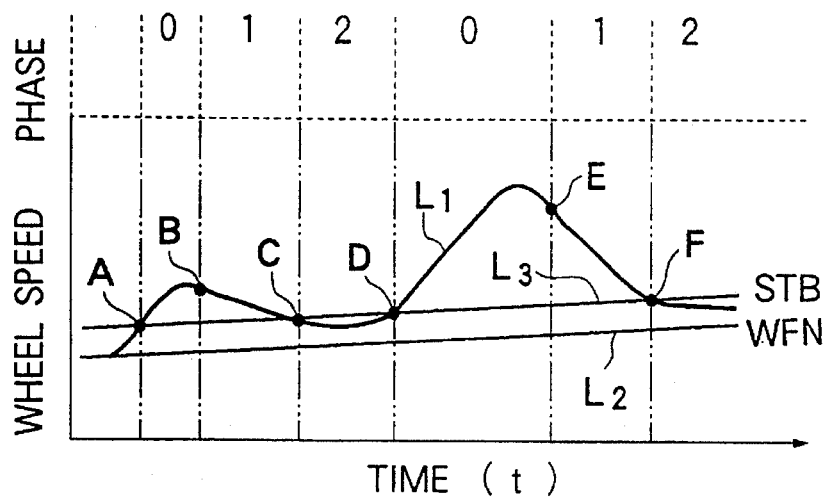
FIGS. 4, 5 and 6 are time charts showing the slip rate brake control of the preferred embodiment.
Figure 5:
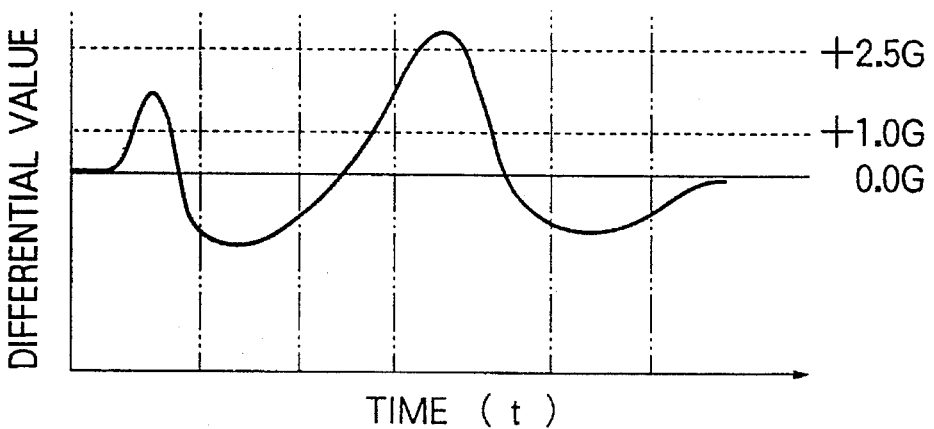

Referring to FIG. 4, an example of the slip rate brake control is explained.

If the speed of drive wheel 1 RL changed as the line L1 indicated in FIG. 4, the control unit would correspondingly change the elements of the control operation. In this case the rear wheel, that is drive wheel 1 RL, has some slip and its speed necessarily has a greater value than the average speed WFN of the front or passive wheel as indicated in line L2. In accordance with the change in the slip rate, the change in the speed of the rear wheel is great and fluctuates around target slip rate STB indicated by line L3.

Corresponding to this change in wheel speed, differential DSL of the difference between the slip rate SL and the target slip rate STA changes as indicated in FIG. 4(b).

In the state when the traction control is being started, when (a) the speed of the drive wheel 1 RL begins to greatly increase when compared with the passive wheels, that is, the slip rate increases and (b) the difference EN exceeds the prescribed value of 1.0 km/h, the control unit initiates Phase 0 control (corresponding to step (S9) of FIG. 3). In phase 0 control (Unitary Control), a control gain is determined based on the differential value DSL of the difference EN. The brake fluid pressure is controlled with good effectiveness to achieve a corresponding change in the slip rate and a stable driving condition.

Once the slip rate has reached its peak value and begins to decrease, if the slip rate ratio SL/MSL decreases to less than or equal to the prescribed value 0.7, the control unit UTR changes the control from Phase 0 to Phase 1. In Phase 1 control, the brake fluid pressure is independently controlled depending on the change in the slip rate of each of the left and right drive wheels. In Phase 1 control, one can achieve control of the wheels with high accuracy.

When the slip rate drops, and at point C the slip rate becomes less than the target slip rate, the control unit UTR changes the control from Phase 1 to Phase 2 (corresponding to step (S6) in FIG. 3). In Phase 2 control, the brake fluid pressure is independently controlled corresponding to the difference EN in the slip rates of the left and right drive wheels 1 RL and 1 RR. In Phase 2 control one can quickly make the slip rate match the target slip rate STB.

Thereafter, when the slip rate SL tends to increase, and at point D the slip rate once again exceeds the target slip rate STB and sharply increases, the control unit UTR switches from Phase 2 control to Phase 0 (corresponding to step (S24) of FIG. 3).

The slip rate SL then once again turns around and tends to decrease. When the slip rate ratio SL/MSL is at point E and becomes less than the prescribed value 0.7, the control unit UTR further switches the control from Phase 0 to Phase 1. After the slip rate SL then turns down at the target slip rate at point F, the control unit UTR once again switches from Phase 1 to Phase 2.

Figure 6:
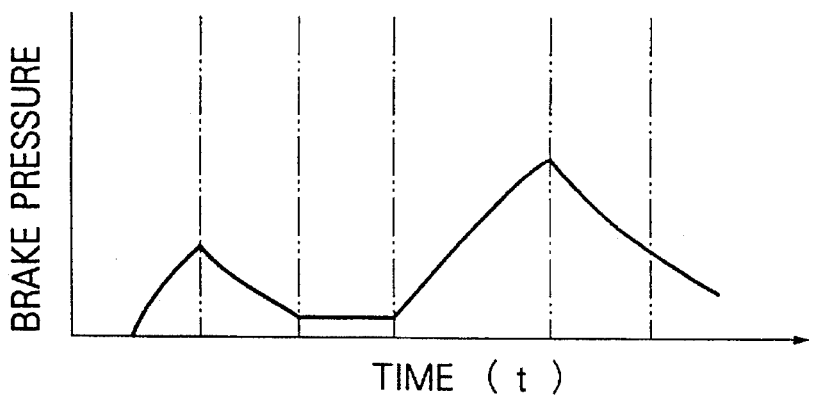

The brake fluid pressure is changed as indicated in FIG. 6 corresponding to the change in slip rate and the related switching in control. The brake fluid pressure is precisely controlled in accordance with the change in slip rate SL as described above.

In the above example, slip rate brake control has been explained, but, in the same manner it is possible for the control to be slip rate engine control. The subthrottle valve 45 can be controlled by means of controlling the signal to the actuator 44, but because the control is effected in the same manner as the above-described slip rate brake control, a specific explanation of its operation is omitted.

According to the present invention, because the control elements relating to the slip rate are changed in accordance with the driving condition of the vehicle, responsiveness is high and the target slip rate can quickly be matched.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A traction control device for a vehicle having drive wheels and passive wheels, comprising:

means for detecting a speed of each of the drive wheels of the vehicle;

means for detecting a speed of each of the passive wheels of the vehicle;

means for calculating an actual slip rate of the drive wheels based on detected speeds of the drive and passive wheels;

means for establishing a target slip rate, from at least one of a plurality of vehicle operating parameters, to control a drive power to the drive wheels; and means for matching the actual slip rate with the target slip rate by controlling driving power of the drive wheels to the road surface;

the driving power of the drive wheels to the road surface being first controlled based on a time differential of a difference between the actual slip rate and the target slip rate at least until a predetermined slip condition is satisfied for the first time and, thereafter, controlled based on the difference between the actual slip rate and the target slip rate.

2. A traction control device according to claim 1, wherein, during a period in which the difference between the actual (SL) and the target slip rates (STA, STB) is increasing, the braking force of each of the drive wheels (1 RL, 1 RR) is controlled identically (Phase 0), and wherein, when the ratio (SL/MSL) of the actual slip rate to a peak time slip rate is less than a predetermined value, the braking force is controlled independently based on said difference with high accuracy (Phase 1).

3. A traction control device according to claim 2 wherein, when the actual slip rate (SL) is greater than the peak time slip rate (MSL) after Phase 1, a fast independent control (Phase 2) of the braking force of the drive wheels (1 RL, 1 RR) is initiated.

4. A traction control device according to claim 2 wherein, when the differential (DSL) of the difference (EN) between the actual slip rate (SL) and the larger slip rate (STA, STB) is greater than a predetermined value after Phase 1, a fast independent control (Phase 2) of the braking force of the drive wheels (1 RL, 1 RR) is initiated.

5. A traction control device according to claim 1 wherein, a fast independent control (Phase 2) of the braking force of the drive wheels (1 RL, 1 RR) is initiated when a difference (EN) between the average slip rate of the left and right drive wheels and the engine control slip rate (STA) is less than a predetermined value.

6. A method for controlling traction of a vehicle having drive wheels and passive wheels, comprising the steps of:

detecting a speed of each of the drive wheels of the vehicle;

detecting a speed of each of the passive wheels of the vehicle;

calculating an actual slip rate of the drive wheels based on detected speeds of the drive and passive wheels;

establishing a target slip rate, from at least one of a plurality of vehicle operating parameters, to control a drive power to the drive wheels; and matching the actual slip rate with the target slip rate by controlling driving power of the drive wheels to the road surface;

the step of controlling said driving power of the drive wheels to the road surface being first carried out based on a time differential of a difference between the actual slip rate and the target slip rate at least until a predetermined slip condition is satisfied for the first time and, thereafter, being carried out based on the difference between the actual slip rate and the target slip rate.

7. A method according to claim 6, wherein, during a period in which the difference between the actual (SL) and the target slip rates (STA, STB) is increasing, the braking force of each of the drive wheels is controlled identically (Phase 0), and wherein, when the ratio (SL/MSL) of the actual slip rate to a peak time slip rate is less than a predetermined value, the braking force is controlled independently based on said difference with high accuracy (Phase 1).

8. A method according to claim 7 wherein, when the actual slip rate (SL) is greater than the peak time slip rate (MSL) after Phase 1, a fast independent control (Phase 2) of the braking force of the drive wheels (1 RL, 1 RR) is initiated.

9. A method according to claim 7 wherein, when the differential (DSL) of the difference (EN) between the actual slip rate (SL) and the target slip rate (STA, STB) is greater than a predetermined value after phase 1, a fast independent control (Phase 2) of the braking force of the drive wheel (1 RL, 1 RR) is initiated.

10. A method according to claim 6 wherein a fast independent control (Phase 2) of the braking force of the drive wheels (1 RL, 1 RR) is initiated when a difference (EN) between the average slip rate of the left and right drive wheels and the engine control slip rate (STA) is less than a predetermined value.

11. A method according to claim 6 wherein the step of establishing comprises establishing a brake control target slip rate (STB) and an engine control target slip rate (STA) which is less than the brake control slip rate (STB), and wherein tile step of matching comprises the following steps:

(a) after the step of calculating the actual slip rate (SL), the step of determining whether the actual slip rate (SL) is greater than or equal to a first prescribed value (S3), wherein if the slip rate (SL) is less than the first value no traction control is carried out (S5);

(b) If the determination in (a) is affirmative, the step of determining whether the actual slip rate (SL) is less than or equal to the brake control target slip rate (STB)(S4), wherein if the determination is affirmative, a fast independent control of the braking force of the drive wheels (Phase 2 control) is initiated (S6);

(c) If the determination in (b) is negative, the step of determining whether a first flag value (F) is equal to 1

(S7), wherein if the determination is affirmative a precise independent control of the braking force of the drive wheels (Phase 1 control) is initiated (S14);

(d) If the determination of (c) is negative, the step of determining whether the first flag value (F) is equal to 2 (S8), wherein if the determination is affirmative, said Phase 2 control is initiated (S20);

(e) if the determination of (d) is negative, the step of initiating an identical control or the braking force of the drive wheels (Phase 0 control (S59);

(f) after step (e), the step of setting a second flag value (SP) equal to 1 (S10);

(g) after step (f), the step of determining whether a predetermined time period has passed (S11), wherein if the determination is affirmative, said Phase 1 control is initiated (S14);

(h) if the determination of (g) is negative, the step of determining whether the ratio (SL, MSL) of the actual slip rate (SL) to a peak time slip rate (MSL) is less than a second prescribed value (preferably 0.7) (S12), wherein if the determination is affirmative, said Phase 1 control is initiated;

(i) If the determination of (h) is negative, the step of determining whether the difference (EN) between an average slip rate of the drive wheels (1 RL, 1 RR) and the engine control slip rate (STA) is less than a third prescribed value (preferably −0.5) (S13), wherein if the determination is affirmative, said Phase 2 control is initiated (S20), and wherein if the determination is negative, said steps of detecting, calculating and establishing are repeated and the step of matching is restarted;

if Phase 1 control is initiated, the step of setting the first flag value (F) equal to 1 (S15);

(k) after step (j), the step of determining whether the actual slip rate (SL) Is greater than a peak slip rate (MSL) (816), wherein if the determination is affirmative, said Phase 2 control is initiated and the first flag value (F) set to equal 2 (S18,19);

(l) if the determination of (k) is negative, the step of determining whether a rifle differential (DSL) of the slip rate (SL) is greater than a fourth prescribed value (preferably 1.0 g) (S17), wherein if the determination is affirmative, said Phase 2 control is initiated and the first flag value (F) set to equal 2 (S18,S19), end wherein when the determination is negative the said steps of detecting, calculating and establishing are repeated and the step of matching is restarted;

(m) if said Phase 2 control is initiated, the step of setting the first flag value (F) equal to 2 (S21);

(n) after step (m), the step of determining whether the second flag value (SP) is equal to 1 and whether the time differential (DSL) of the slip rate Is greater than a fifth prescribed value (preferably 3.0 g) (S22), wherein if the determination Is affirmative, said Phase 0 control is initiated and the first flag value (F) is set to equal 0 (S25,S26); and (o) if the determination of (n) is negative, the step of determining whether the second flag value (SP) is equal to 0 and the difference of step (i) is greater than a sixth prescribed value (preferably 1.0 km/h) (S24), wherein if the determination is affirmative, said Phase 0 control is initiated and the first flag value (F) set to equal 0 (S25,S26), and wherein if the determination is negative said steps of detecting, calculating and establishing are repeated and the step of matching is restarted.

* * * * *